US012561359B1

(12) United States Patent
Rakshit et al.

(10) Patent No.: US 12,561,359 B1
(45) Date of Patent: Feb. 24, 2026

(54) DYNAMIC DATA EXTRACTION BASED ON KEY INFLUENCING FACTORS

(71) Applicant: International Business Machines Corporation, Armonk, NY (US)

(72) Inventors: Sarbajit Kumar Rakshit, Kolkata (IN); Sathya Santhar, Chennai (IN); Sridevi Kannan, Chennai (IN); Neeraj Kumar, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/007,853

(22) Filed: Jan. 2, 2025

(51) Int. Cl.
| | |
|---|---|
| *G06F 16/35* | (2025.01) |
| *G06F 9/50* | (2006.01) |
| *G06F 21/10* | (2013.01) |
| *G06F 40/284* | (2020.01) |

(52) U.S. Cl.
CPC ............ *G06F 16/35* (2019.01); *G06F 9/5038* (2013.01); *G06F 21/1078* (2023.08); *G06F 40/284* (2020.01)

(58) Field of Classification Search
CPC .... G06F 16/35; G06F 9/5038; G06F 21/1078; G06F 40/284
See application file for complete search history.

(56) References Cited

U.S. PATENT DOCUMENTS

| | | | |
|---|---|---|---|
| 11,269,911 B1 | 3/2022 | Jones et al. | |
| 2020/0327364 A1 | 10/2020 | Hickerson et al. | |
| 2021/0035015 A1* | 2/2021 | Edgar | G06F 18/211 |
| 2022/0198222 A1* | 6/2022 | Rawat | G06F 8/4452 |
| 2022/0327058 A1* | 10/2022 | Vu | G06F 12/0871 |
| 2024/0104401 A1* | 3/2024 | Dembo | G06Q 10/0635 |
| 2024/0111745 A1* | 4/2024 | Wendel, III | G06F 16/24558 |
| 2024/0281419 A1 | 8/2024 | Alfaras et al. | |

(Continued)

OTHER PUBLICATIONS

"Cencora",https://www.cencora.com/, dated Mar. 18, 2025, 9 pages.

(Continued)

*Primary Examiner* — Dangelino N Gortayo

(74) *Attorney, Agent, or Firm* — Garg Law Firm, PLLC; Rakesh Garg; Lily Neff

(57) ABSTRACT

An embodiment provides for dynamic data extraction based on key influencing factors. The embodiment preprocesses data comprises key influencing factors from authentic sources. and extracts relevant features from the data. The embodiment represents key characteristics of the key influencing factors based on the relevant features and detects changes in the key influencing factors based on contextual shifts in the key influencing factor. The embodiment dynamically adjusts a data extraction process based in part on the contextual shift in the key influencing factor and identifying a top key influencing factor by analyzing data source. The embodiment classifying and ranking a first dataset from the data source based on the top key influencing factor and prioritizing a processing pipeline for the first dataset. The embodiment cloning the processing pipeline for a second dataset and provides an interface, via a consumption layer, for interacting with the first and second datasets.

20 Claims, 8 Drawing Sheets

(56) References Cited

U.S. PATENT DOCUMENTS

2024/0311853 A1    9/2024   Rendahl et al.

OTHER PUBLICATIONS

Ali Kidwai, "The Synergy of Algorithms: Generative AI Redefining Data Engineering", Polestar, Nov. 16, 2023, 14 pages.

Anahita Barzegar, "Building Dynamic DAGs and Tasks for Data Pipelines with Apache Airflow", Medium, Jun. 18, 2023, 12 pages.

Authors et. al.: PT Tokopedia, IP.com No. IPCOM000266873D, Scalable Big Data Processing Using On-Demand Pipeline, Aug. 30, 2021, 5 pages.

Ethan, "Custom ETL: How to Build Winning Data Pipelines (No Code)", Portable, Dec. 9, 2022, 10 pages.

Jane Temov, "Dynamic Data Subsetting—The Power of Data Cloning", enov8, May 2023, 17 pages.

Linkedin, "How can you identify your customer's top priorities when developing a new product?", https://www.linkedin.com/advice/1/how-can-you-identify-your-customers-top-priorities-91vjf, dated Mar. 18, 2025, 7 pages.

Pankaj Tripathi, "Everything You Need to Know About Intelligent Data Extraction", Doc Sumo, Jan. 21, 2025, 10 pages.

Varghese Chacko, "Building a Custom ETL Tool: Unlocking Data Integration Possibilities", Linkedin, Aug. 11, 2023, 7 pages.

* cited by examiner

200

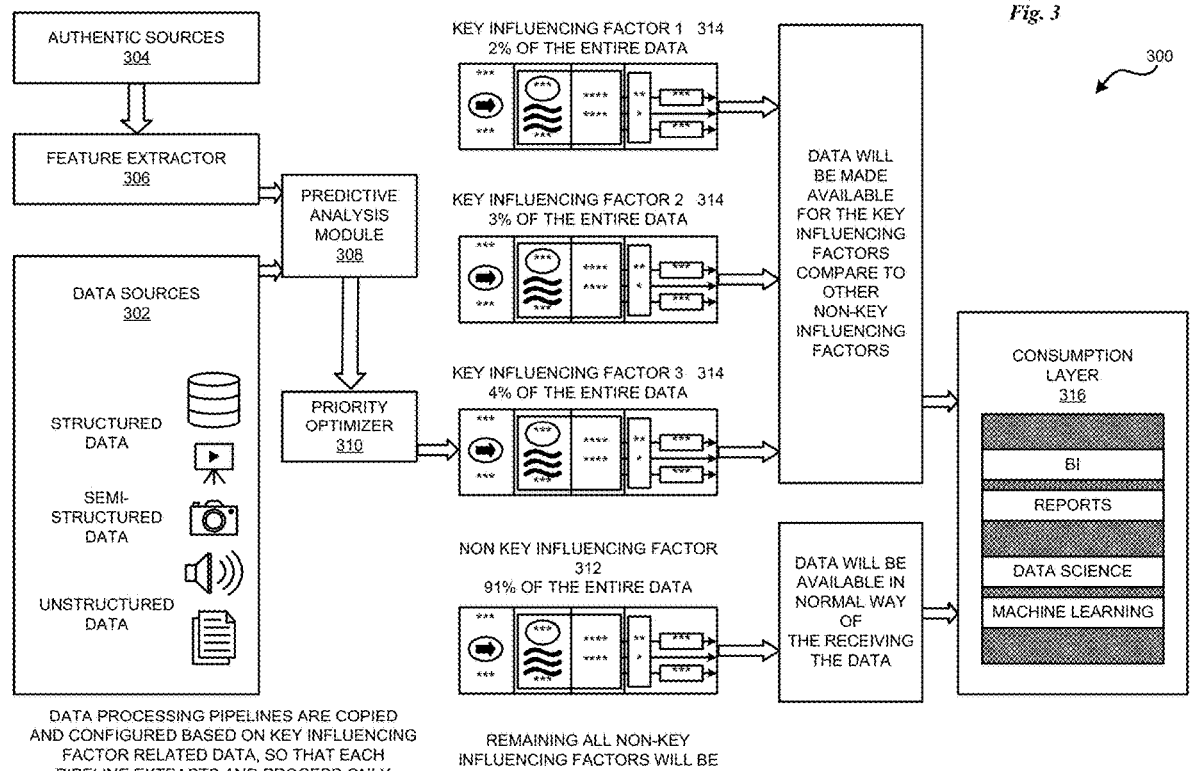

AUTHENTIC SOURCES
304

FEATURE EXTRACTOR
306

PREDICTIVE ANALYSIS MODULE
308

DATA SOURCES
302

STRUCTURED DATA

SEMI-STRUCTURED DATA

UNSTRUCTURED DATA

PRIORITY OPTIMIZER
310

KEY INFLUENCING FACTOR 1   314
2% OF THE ENTIRE DATA

KEY INFLUENCING FACTOR 2   314
3% OF THE ENTIRE DATA

KEY INFLUENCING FACTOR 3   314
4% OF THE ENTIRE DATA

NON KEY INFLUENCING FACTOR
312
91% OF THE ENTIRE DATA

DATA WILL BE MADE AVAILABLE FOR THE KEY INFLUENCING FACTORS COMPARE TO OTHER NON-KEY INFLUENCING FACTORS

DATA WILL BE AVAILABLE IN NORMAL WAY OF THE RECEIVING THE DATA

CONSUMPTION LAYER
316

BI

REPORTS

DATA SCIENCE

MACHINE LEARNING

DATA PROCESSING PIPELINES ARE COPIED AND CONFIGURED BASED ON KEY INFLUENCING FACTOR RELATED DATA, SO THAT EACH PIPELINE EXTRACTS AND PROCESS ONLY FOR THE KEY INFLUENCING FACTOR

REMAINING ALL NON-KEY INFLUENCING FACTORS WILL BE LOADED WITH NORMAL EXTRACTION AND PROCESSING TIME FRAME

410

412     414

500

700

DYNAMIC DATA EXTRACTION BASED ON KEY INFLUENCING FACTORS

BACKGROUND

The present invention relates generally to network management. More particularly, the present invention relates to industrial automation for dynamic cloning and configuring data extraction for processing pipeline for key influencing factors.

Network management is essential for monitoring, controlling, and optimizing communications within industrial settings where data is continuously transmitted between devices, sensors, and control systems. Efficient network management ensures that information flows smoothly across interconnected systems, reducing bottlenecks and enhancing overall productivity. By integrating dynamic capabilities into network management, organizations can maintain stability and adaptability in data processing while efficiently managing resources.

In an industrial environment, identifying and processing key influencing factors is critical to maintaining optimal system performance and supporting decision-making. Industries require efficient prioritization of data extraction, balancing processing loads, and optimizing workflows. There exists a demand for flexible and robust solutions for handling changing data requirements and network conditions, ultimately facilitating high-performance data analytics and real-time monitoring in industrial settings.

SUMMARY

By identifying contextual shifts and predicting the influencing factors which are to be prioritized, the proposed system targets and extracts only the relevant key sets of data aligned with key influencing factors and streamlines processing and ensures that the required data is made available in a timely manner, the substantial reduction in data volume, data is made available in a timely fashion.

The illustrative embodiments provide for dynamic data extraction based on key influencing factors. Illustrative embodiments include preprocessing data comprising a key influencing factor from an authentic source. In some embodiments, preprocessing the data comprises a of removing errors, standardizing values in the data, transforming the data, structuring the data into a suitable format. In some embodiments, preprocessing the data comprises a of tokenization, normalization, and encoding the data.

Illustrative embodiments also include extracting a relevant feature from the data. In some embodiments, extracting the relevant feature comprises using a of word embedding, and term frequency-inverse document frequency (TF-IDF).

Illustrative embodiments also include representing a key characteristic of the key influencing factor based on the relevant feature. Illustrative embodiments also include detecting changes in the key influencing factor based at least in part on a contextual shift in the key influencing factor.

Illustrative embodiments also include dynamically adjusting a data extraction process based at least in part on the contextual shift in the key influencing factor. Illustrative embodiments also include identifying a top key influencing factor by analyzing a data source. Based on the identified key influencing factors and their specific data extraction timings, projected daily data volume, and the required frequency of data refresh requests from these key influencing factors, illustrative embodiments dynamically construct a customized data extraction and processing pipeline for each key influencing factor, and strategically schedule extraction times and refresh frequencies, ensuring that the data for each key influencing factor is processed and updated in a manner that aligns with their unique requirements. In some embodiments, the data source comprises a of a client record, a table, transaction data, video data, an image, audio data, and a document. In some embodiments, detecting the changes in the key influencing factor, dynamically adjusting the data extraction process, and identifying the top key influencing factor are implement via a deep neural network.

Illustrative embodiments also include classifying and ranking at least a first dataset from the data source based on the top key influencing factor. Illustrative embodiments also include prioritizing a processing pipeline for the at least first dataset. Illustrative embodiments also include cloning the processing pipeline for at least a second dataset. In some embodiments, classifying and ranking at least the first dataset, prioritizing the processing pipeline, and cloning the processing pipeline are implemented via a deep neural network.

Illustrative embodiments also include providing an interface, via a consumption layer, for interacting with at least the first and second datasets. In some embodiments, consumption layer enables a of analytics, business intelligence (BI), reporting, machine learning and data science workflows.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example data extraction application in prioritized operation based on detected changes in key influencing factors in accordance with an illustrative embodiment;

DETAILED DESCRIPTION

Figure 1:
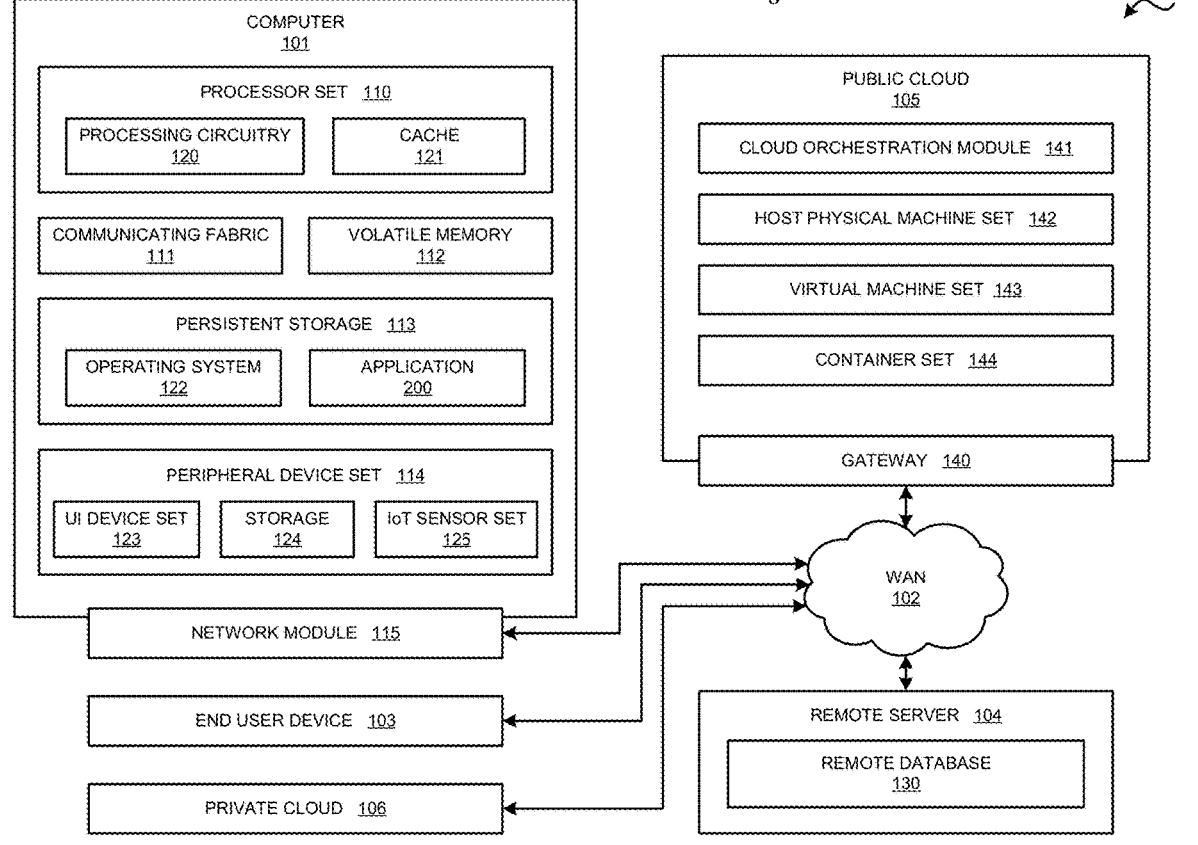
FIG. 1 depicts a block diagram of a computing environment in accordance with an illustrative embodiment.

Various industries, such as the pharmaceutical distribution industry, are currently facing multiple critical challenges to pricing management and customer satisfaction that pose significant operational and financial risks for companies. Frequent customer-specific price changes of pharmaceutical products lead to customer confusion and dissatisfaction as companies struggle to maintain consistent pricing structures. This inconsistency not only disrupts the customer experience but also hampers the company's ability to build long-term relationships and trust with its clientele. Consequently, the company faces customer attrition, decreased sales, and potential revenue loss.

Additionally, delays in effectively communicating price changes to end customers; due to inefficient processes or inadequate communication channels, often lead to customers not be promptly informed about changes in product prices. This lack of timely communication can lead to misunderstandings, customer complaints, and can negatively impact a company's reputation. This creates an incentive for customers to choose alternative suppliers that offer better communication and transparency, which can significantly impact a company's market share.

A company's pricing calculation system is intricate and time-consuming, preventing real-time updates of pricing information on e-commerce platforms. This deficiency impedes customer decision-making processes, as they are unable to make informed purchasing choices based on accurate and up-to-date pricing data. As a result, the company may face diminished customer satisfaction, lost sales opportunities, and an overall competitive disadvantage in the e-commerce space.

Companies that deal with extensive ranges of products and/or large customer bases must contend with a substantial volume of data to process when updating their price catalogue. This data processing bottleneck leads to delays in providing accurate and current pricing information to customers. Consequently, customers may receive outdated pricing details, leading to confusion, errors in ordering, and potential lost revenue for the company.

As a company's customer catalog undergoes time-consuming processing, there are instances of discrepancies and delays in updating the offer prices. This inconsistency creates fairness issues among customers, eroding their trust in the company's pricing practices and resulting in a lack of transparency. Furthermore, it may lead to customer dissatisfaction, loss of customer loyalty, and decreased overall revenue for the company.

In summary, companies face critical distribution problems that require immediate attention and a comprehensive solution to enhance pricing management, streamline communication processes, ensure real-time information availability, expedite catalogue updates, and promote fairness and transparency in pricing across all customers. Resolving these issues is crucial for the company to improve customer satisfaction, retain market share, and optimize its overall operational efficiency and financial performance.

The present disclosure addresses the deficiencies described above by leveraging specific authoritative sources to detect changes in the definition of key influencing factors prior to extracting data from various source systems. "Key influencing factors" as the term is used herein, refers to the primary drivers of data demand. Examples of key influencing factors may include but are not limited to key customers, key products, externalities that can be anticipated to impact a company's business, such as trends or shifts in political, environmental, or societal import, and the like or combinations thereof. Circumstances can impact what is considered a key influencing factor, such as shifts in demand trends, for example, in the field of public health, demand trends may be governed by outbreaks of disease, pandemics, or increased focus on specific treatment areas, and the like can elevate certain influencing factors to key status due to their sudden shift in demand.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media.

As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as a data extraction application 200 that provides insights into a network's performance and characteristics of network usage, and provides incentives to network users for reducing or avoiding excessive network usage. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115.

Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
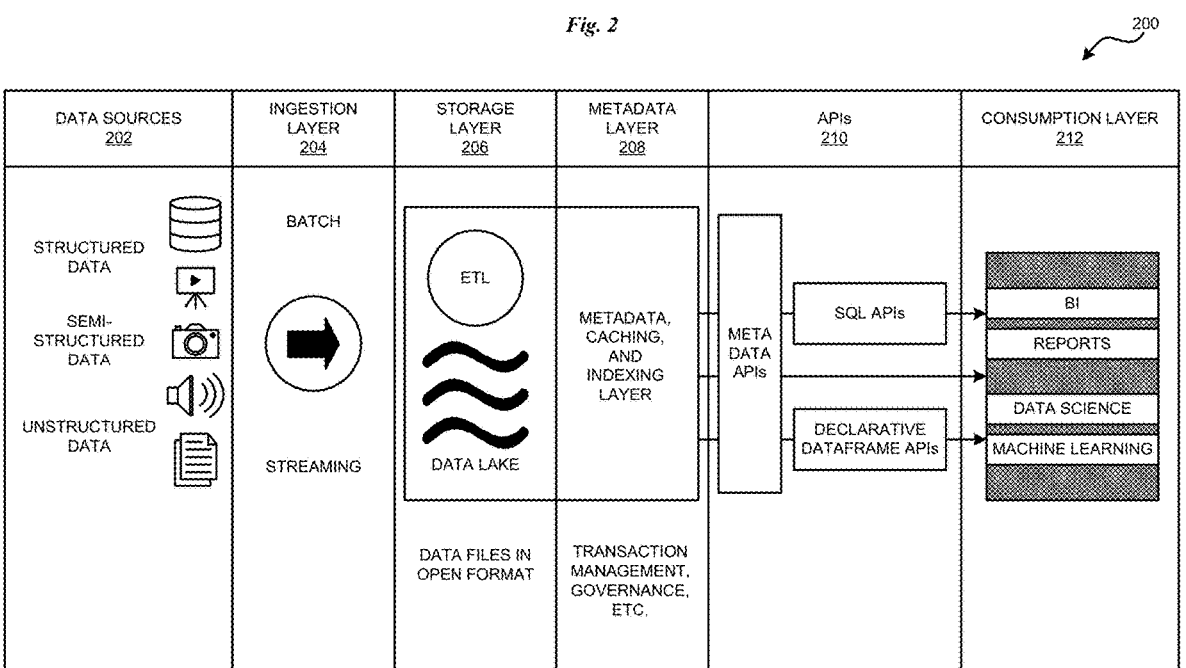
FIG. 2 depicts a block diagram of an example data extraction application in non-prioritized operation.

With reference to FIG. 2, this figure depicts a block diagram of an example data extraction application 200 in non-prioritized operation in accordance with an illustrative embodiment. In the illustrated embodiment, data extraction application 200 may be an example of data extraction application 200 of FIG. 1.

In the illustrated embodiment, data is provided to data extraction application 200 from various data sources 202. Such data may include but is not limited to client records, tables, transaction data, video data, images, audio data, documents, and the like and may be structured data, semi-structured data, unstructured data, and the like or combinations thereof.

In the illustrated embodiment, data from various data sources 202 flows into injection layer 204. Data may be provided in batches or may be streamed in real-time into data extraction application 200 as the data is generated.

In the illustrated embodiment, data is moved into storage layer 206, which supports Extract, Transform, Load (ETL) processes and storage of data using open formats, such as uses open file formats such as Parquet, ORC, Avro, Delta Lake, and the like. In some embodiments, storage layer 206 may be structure as a data lakehouse. As used herein, a "data lakehouse" refers to a data platform that manages structured data, semi-structured data, unstructured data, and the like and combinations thereof. Examples of data lakehouses may include but are not limited to data warehouses, data marts, data lakes, online transaction processing (OLTP) systems, or the like or combinations thereof.

Metadata layer 208 provides indexing of commonly queried data and cashing of frequently accessed data or metadata in memory to reduce the time associated with data retrieval from storage layer 206.

In the illustrated embodiment, application programming interfaces (APIs) 210 provide standardized ways for interaction with the features of data extraction application 200, making it easier for to work with data and automate tasks. Consumption layer 212 provides an interface for interacting with and deriving value from the data stored and processed in data extraction application 200. Consumption layer 212 enables analytics, business intelligence (BI), reporting, machine learning, and data science workflows by providing tools for accessing and querying data, transforming raw data into actionable insights that support decision-making.

With reference to FIG. 3, this figure depicts a block diagram of an example data extraction application 300 in prioritized operation based on detected changes in key influencing factors in accordance with an illustrative embodiment. In the illustrated embodiment, data sources 302 are examples of data sources 202 of FIG. 2. However, in addition to the data flow from data sources 302, the data extraction application 300 intakes data from various authentic sources 304 containing key influencing factor trend data. As used herein, "authentic sources" refers to sources of truth (SoTs) sources that are highly reliable, vetted, and foundational and that provide consistent, accurate information. Authentic sources may include but are not limited to company provided policy documents and historic record data, company provided marketing strategy and search engine optimization (SEO) results, market research data, government rules and regulations, news feeds from trusted news sources pertaining to topics of particular relevance to the company or industry, and the like.

In the illustrated embodiment, data from authentic sources 304 passes to feature extractor 306 which preprocesses and extracts relevant features from the data to represent the key characteristics of the influencing factors. In some embodiments, preprocessing may include removing errors, standardizing values in the data, transforming, and structuring the data into a suitable format. In some embodiments, techniques like tokenization, normalization, and encoding may be applied depending on the nature of the data (e.g. structured, unstructured, semi-structured, etc.) Structured data features may include but are not limited to customer attributes such as ID, transaction history, etc. In some embodiments, unstructured data, features might be extracted using techniques like word embeddings, term frequency-inverse document frequency (TF-IDF), and the like.

In the illustrated embodiment, predictive analysis module 308 uses the extracted relevant features to detect changes in key influencing factors definitions based on contextual shifts and dynamically adjusts its data extraction process. Predictive analysis module 308 analyzes data sources 302 and identifying the top key influencing factors while predicting the corresponding data volume and extraction time. Predictive analysis module 308 then classifies and ranks the entire dataset based on identified key influencing factors.

By analyzing key influencing factors' historical data access patterns, predictive analysis module 308 identifies key influencing factor-specific data requirements. These key influencing factor-specific data requirements are then passed to priority optimizer 310 to ensure that relevant data is prioritized for extracting and processing. Datasets that are not associated with key influencing factors proceed in due course according to existing non-prioritized pipeline 312, such as outlined with reference to FIG. 2. Priority optimizer 310 then provides prioritized pipelines 314 for datasets associated with key influencing factors by cloning the existing data processing pipeline, and configure the same with identified key influencing factors specific parameters, ranked according to the dataset priority rankings. For each key influencing factor or group of key influencing factors, priority optimizer 310 identifies how many cloning operations are to be performed of the exiting data processing pipeline.

Both the datasets processed according to prioritized pipelines 314 as well as existing non-prioritized pipeline 312 are then made available to consumption layer 316, such as consumption layer 212 of FIG. 2. This streamlined approach reduces data volume while providing timely access to key influencing factors with the necessary information. In some embodiments, predictive analysis module 308 and priority optimizer 310 may be implemented as deep neural networks (DNNs).

Figure 4A:
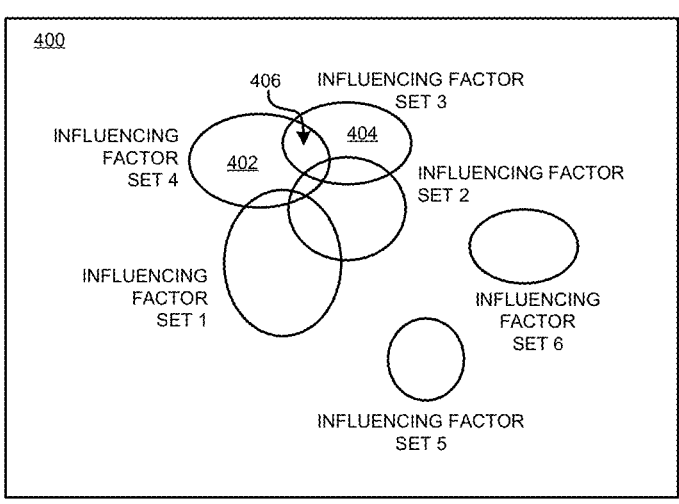
FIG. 4A depicts a set diagram of an exemplary collection of key influencing factors in accordance with an illustrative embodiment.

With reference to FIG. 4A, this figure depicts a set diagram of an exemplary collection of key influencing factors as they may relate to dataset space 400 as might be identified by predictive analysis module 308 of FIG. 3. In the illustrated embodiment, key influencing factor 402 and key influencing factor 404 overlap such that they are each equally applicable to datasets found in region 406.

As each key influencing factor corresponding to a different prioritization ranking, having datasets that qualify under more than one key influencing factor produces redundancies. As such, some embodiments consolidate key influencing factors datasets by applying inclusion-exclusion principle of set theory to identify optimum filter criteria considering priority and data volume in each set and use the optimum filter criteria in prioritized pipelines 314, such as in FIG. 3.

$$n(A \cup B) = n(A) + n(B) - n(A \cap B)$$

Figure 4B:
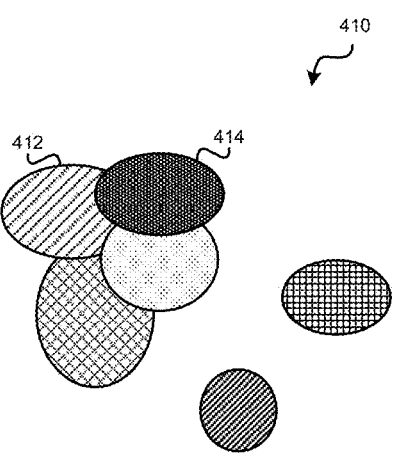
FIG. 4B depicts a set diagram of an exemplary consolidated collection of key influencing factors in accordance with an illustrative embodiment.

With reference to FIG. 4B, this figure depicts a set diagram of an exemplary consolidated collection of key influencing factors as they may relate to dataset space 410 as might be identified by predictive analysis module 308 of FIG. 3. Dataset space 410 is an example of dataset space 400 of FIG. 4A after the application of the consolidation scheme discussed hereinabove. In the illustrated embodiment, key influencing factor 412 and key influencing factor 414 occupy contiguous regions but do not include any overlapping region.

Figure 5:
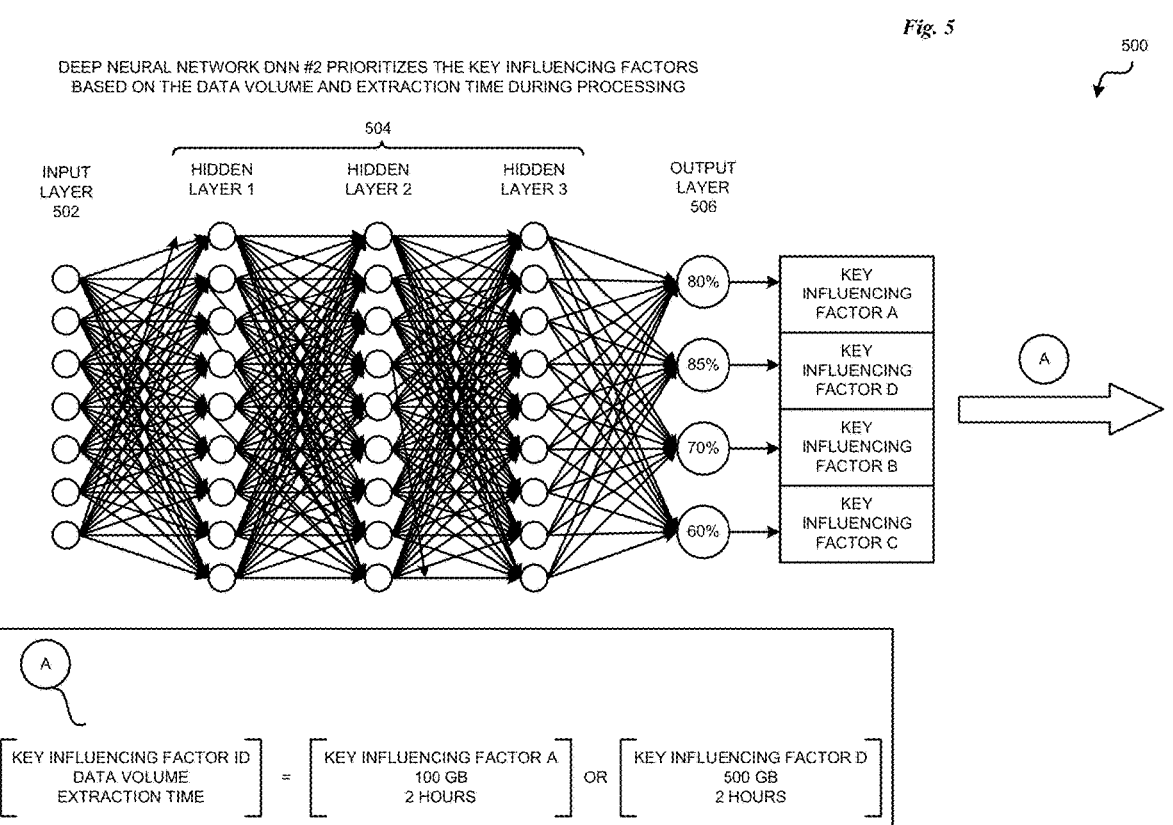
FIG. 5 depicts a block diagram of an exemplary deep neural network in accordance with an illustrative embodiment.

With reference to FIG. 5, this figure depicts a block diagram of an example deep neural network 500 in accordance with an illustrative embodiment. In the illustrated embodiment, deep neural network 500 is an example of predictive analysis module 308 of FIG. 3. In the illustrated embodiment, input layer 502 receives input features such as those features extracted by feature extractor 306 of FIG. 3.

In the illustrated embodiment, hidden layers 504 consist of multiple layers of neurons responsible for learning complex patterns in the input feature data. In some embodiments, hidden layers 504 may include dense, convolutional layers when dealing with image data. In some embodiments, hidden layers 504 may include recurrent layers when dealing with sequential data.

In the illustrated embodiment, output layer 506 outputs a vector containing information about key influencing factors, such as for example, IDs, predicted data volume, extraction time, and the like. The output vector serves to indicate which key indicating factors, if any, are represented by the extracted feature data and dynamically adapting the data processing pipeline, such as changing, adding or removing the processing parameters and parameter values and changing the execution frequency scripting. In this way deep neural network 500 ensures processed data for the key influencing factors can be made available in a timely fashion.

Figure 6:
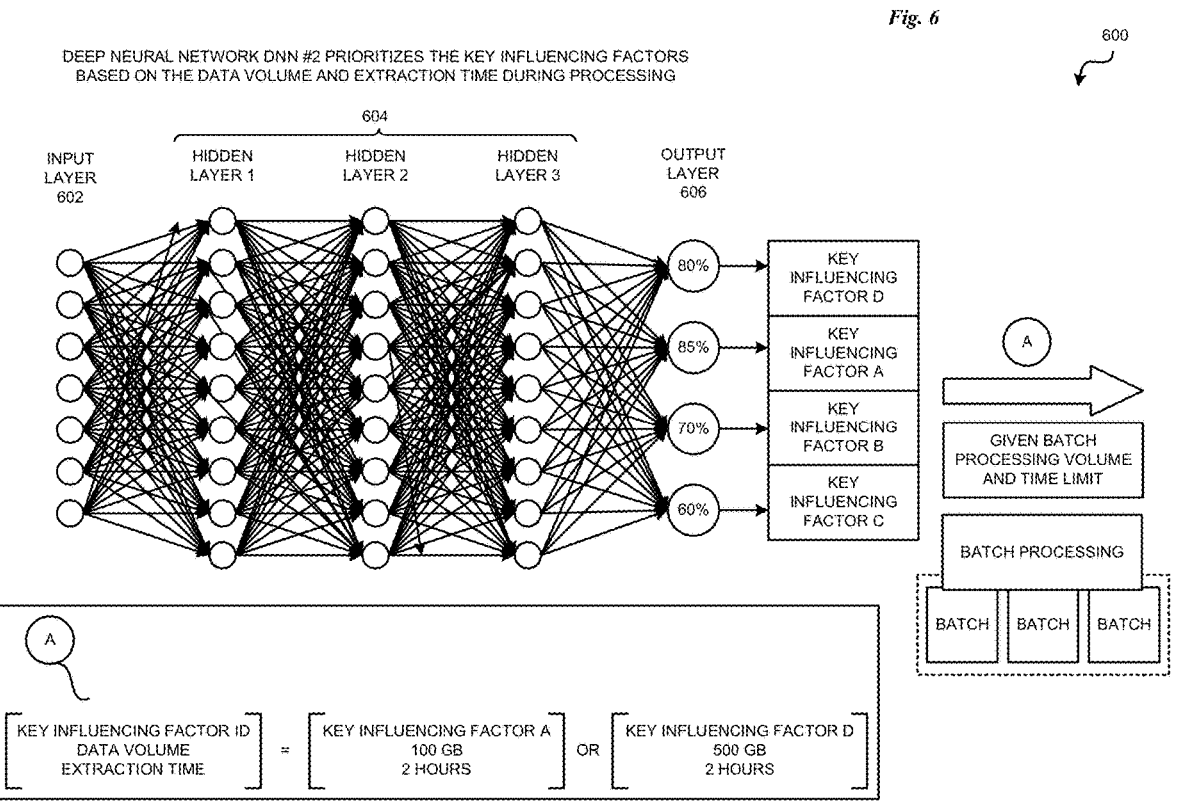
FIG. 6 depicts a block diagram of an exemplary deep neural network.

With reference to FIG. 6, this figure depicts a block diagram of an example deep neural network 600 in accordance with an illustrative embodiment. In the illustrated embodiment, deep neural network 600 is an example of priority optimizer 310 of FIG. 3. In the illustrated embodiment, input layer 602 receives key influencing factor information, such as that generated by predictive analysis module 308 of FIG. 3 and deep neural network 500 of FIG. 5, as well as batch job load limits.

In the illustrated embodiment, hidden layers 604 consist of multiple layers of neurons responsible for learning to prioritize key influencing factors based on data volume and extraction time. In some embodiments, hidden layers 604 may use techniques such as attention mechanisms or recurrent layers. In the illustrated embodiment, output layer 606 outputs a prioritized list of key influencing factors along with batch sequence numbers and batch times.

Figure 7:
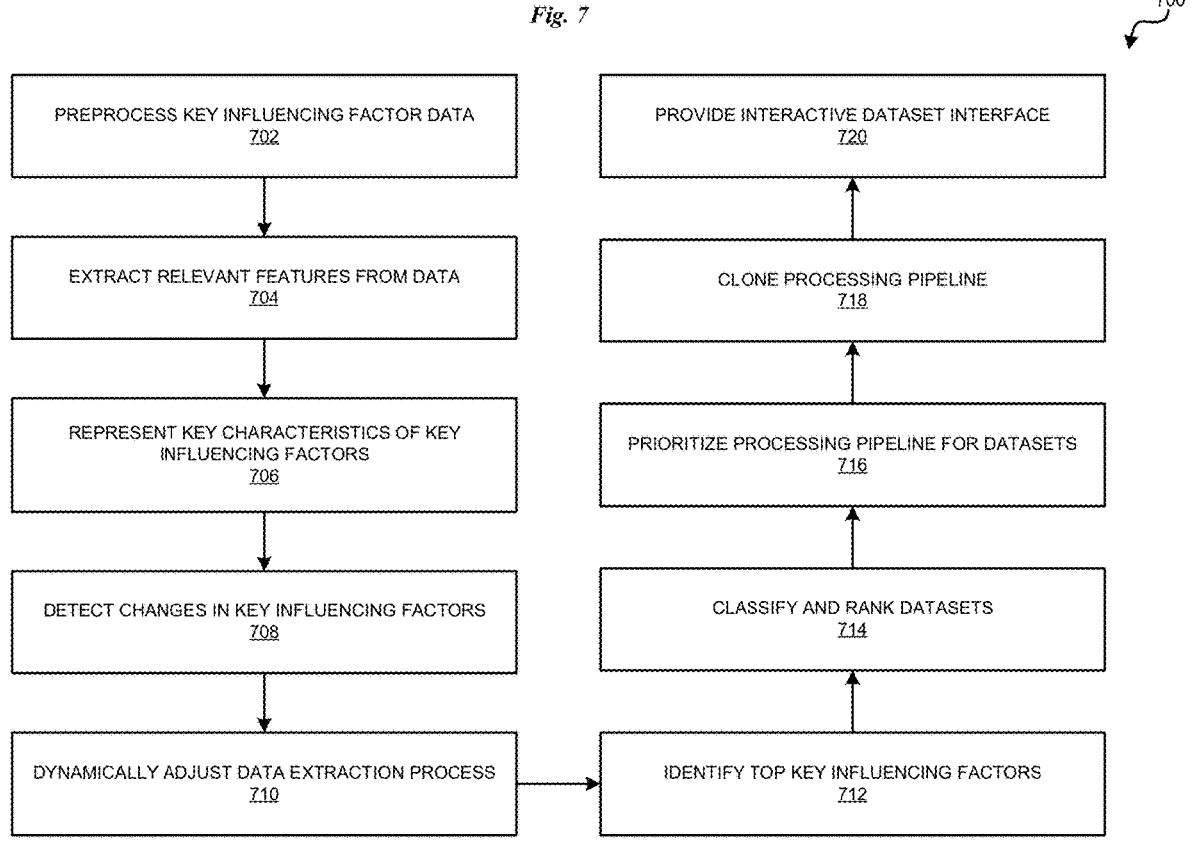
FIG. 7 depicts a flowchart of an example process 700 for industrial automation for dynamic cloning and configuring data extraction for processing pipeline for key influencing factors in accordance with an illustrative embodiment.

With reference to FIG. 7, this figure depicts a flowchart of an example process 700 for industrial automation for dynamic cloning and configuring data extraction for processing pipeline for key influencing factors in accordance with an illustrative embodiment. In a particular embodiment, data extraction application 200 of FIG. 1 or network management module 300 of FIG. 3 carries out the process 700.

In the illustrated embodiment, at block 702, the process preprocesses data comprising a key influencing factor from an authentic source. In some embodiments, preprocessing the data comprises a of removing errors, standardizing values in the data, transforming the data, structuring the data into a suitable format. In some embodiments, preprocessing the data comprises a of tokenization, normalization, and encoding the data.

Next, at block 704, the process extracts a relevant feature from the data. In some embodiments, extracting the relevant feature comprises using a of word embedding, and term frequency-inverse document frequency (TF-IDF). Next, at block 706, the process represents a key characteristic of the key influencing factor based on the relevant feature.

Next, at block 708, the process detects changes in the key influencing factor based at least in part on a contextual shift in the key influencing factor. Next, at block 710, the process dynamically adjusts a data extraction process based at least in part on the contextual shift in the key influencing factor. Next, at block 712, the process identifies a top key influencing factor by analyzing a data source. In some embodiments, the data source comprises a of a client record, a table, transaction data, video data, an image, audio data, and a document. In some embodiments, detecting the changes in the key influencing factor, dynamically adjusting the data extraction process, and identifying the top key influencing factor are implement via a deep neural network.

Next, at block 714, the process classifies and ranks at least a first dataset from the data source based on the top key influencing factor. Next, at block 716, the process prioritizes a processing pipeline for the at least first dataset. Next, at block 718, the process clones the processing pipeline for at least a second dataset. In some embodiments, classifying and ranking at least the first dataset, prioritizing the processing pipeline, and cloning the processing pipeline are implemented via a deep neural network.

Next, at block 720, the process provides an interface, via a consumption layer, for interacting with at least the first and second datasets. In some embodiments, the consumption layer enables a of analytics, business intelligence (BI), reporting, machine learning and data science workflows.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

preprocessing, via a feature extractor, data comprising a key influencing factor from an authentic source;

extracting a relevant feature from the data;

representing a key characteristic of the key influencing factor based on the relevant feature;

detecting, via a predictive analysis module, a change in the key influencing factor based at least in part on a contextual shift in the key influencing factor;

dynamically adjusting, via the predictive analysis module, a scheduled extraction times and a refresh frequency for a data extraction process based on the contextual shift in the key influencing factor;

identifying, via the predictive analysis module, a top key influencing factor by analyzing a data source;

classifying and ranking, via a priority optimizer, a first dataset from the data source based on the top key influencing factor;

prioritizing, via the priority optimizer, a processing pipeline for the at least a first dataset;

cloning, via the priority optimizer, the processing pipeline for at least a second dataset; and providing an interface, via a consumption layer, for interacting with the at least first and second datasets.

2. The computer-implemented method of claim 1, wherein preprocessing the data comprises a of removing errors, standardizing values in the data, transforming the data, structuring the data into a format.

3. The computer-implemented method of claim 1, wherein preprocessing the data comprises a of tokenization, normalization, and encoding the data.

4. The computer-implemented method of claim 1, wherein extracting the relevant feature comprises using a of word embedding, and term frequency-inverse document frequency (TF-IDF).

5. The computer-implemented method of claim 1, wherein the data source comprises a of a client record, a table, transaction data, video data, an image, audio data, and a document.

6. The computer-implemented method of claim 1, wherein the consumption layer enables a of analytics, business intelligence (BI), reporting, machine learning and data science workflows.

7. The computer-implemented method of claim 1, wherein the predictive analysis module is implemented as a deep neural network.

8. The computer-implemented method of claim 1, wherein the priority optimizer is implemented as a deep neural network.

9. The computer-implemented method of claim 7, wherein the reinforcement learning algorithm performing a series of actions and evaluates how each action affects the performance parameter.

10. A computer program product comprising one or more computer readable storage media, and program instructions collectively stored on the one or more computer readable storage media, the program instructions executable by a processor to cause the processor to perform operations comprising:

preprocessing, via a feature extractor, data comprising a key influencing factor from an authentic source;

extracting a relevant feature from the data;

representing a key characteristic of the key influencing factor based on the relevant feature;

detecting, via a predictive analysis module, changes in the key influencing factor based at least in part on a contextual shift in the key influencing factor;

dynamically adjusting, via the predictive analysis module, a data extraction process based at least in part on the contextual shift;

identifying, via the predictive analysis module, a top key influencing factor by analyzing a data source;

classifying and ranking, via a priority optimizer, at least a first dataset from the data source based on the top key influencing factor;

prioritizing, via the priority optimizer, a processing pipeline for the at least a first dataset;

cloning, via the priority optimizer, the processing pipeline for at least a second dataset; and providing an interface, via a consumption layer, for interacting with the at least first and second datasets.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, wherein preprocessing the data comprises a of removing errors, standardizing values in the data, transforming the data, structuring the data into a format.

14. The computer program product of claim 10, wherein extracting the relevant feature comprises using a of word embedding, and term frequency-inverse document frequency (TF-IDF).

15. The computer program product claim 10, wherein the predictive analysis module is implemented as a deep neural network.

16. The computer program product claim 10, wherein the priority optimizer is implemented as a deep neural network.

17. A computer system comprising a processor and one or more computer readable storage media, and program instructions collectively stored on the one or more computer readable storage media, the program instructions executable by the processor to cause the processor to perform operations comprising:

preprocessing, via a feature extractor, data comprising a key influencing factor from an authentic source;

extracting a relevant feature from the data;

representing a key characteristic of the key influencing factor based on the relevant feature;

detecting, via a predictive analysis module, changes in the key influencing factor based at least in part on a contextual shift in the key influencing factor;

dynamically adjusting, via the predictive analysis module, a data extraction process based at least in part on the contextual shift;

identifying, via the predictive analysis module, a top key influencing factor by analyzing a data source;

classifying and ranking, via a priority optimizer, at least a first dataset from the data source based on the top key influencing factor;

prioritizing, via the priority optimizer, a processing pipeline for the at least a first dataset;

cloning, via the priority optimizer, the processing pipeline for at least a second dataset; and providing an interface, via a consumption layer, for interacting with the at least first and second datasets.

18. The computer system of claim 17, wherein preprocessing the data comprises a of removing errors, standardizing values in the data, transforming the data, structuring the data into a format.

19. The computer system of claim 17, wherein the predictive analysis module is implemented as a deep neural network.

20. The computer system of claim 17, wherein the priority optimizer is implemented as a deep neural network.

* * * * *